March 13, 1951  H. B. HEMB  2,545,029

VIBRATING APPARATUS FOR MOLDING CONCRETE SLABS

Filed April 16, 1949  3 Sheets-Sheet 1

Inventor
Harald B. Hemb.
By Frederick F. Mason
Atty

March 13, 1951  H. B. HEMB  2,545,029
VIBRATING APPARATUS FOR MOLDING CONCRETE SLABS
Filed April 16, 1949  3 Sheets-Sheet 2

Inventor
Harald B. Hemb,
By Frederick F. Mason
Atty

March 13, 1951  H. B. HEMB  2,545,029
VIBRATING APPARATUS FOR MOLDING CONCRETE SLABS
Filed April 16, 1949  3 Sheets-Sheet 3
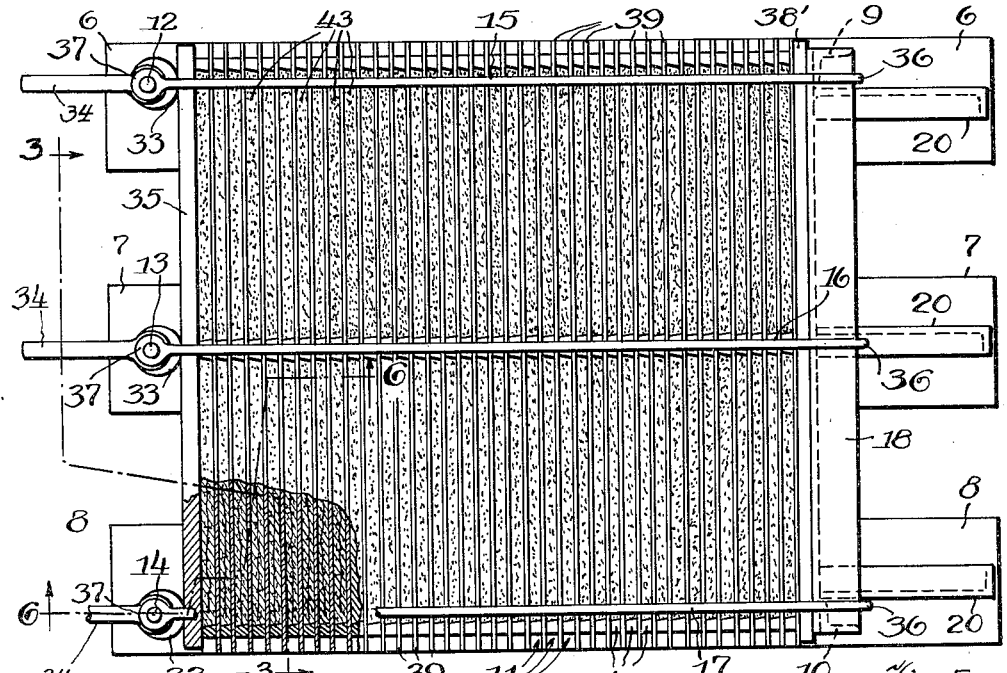
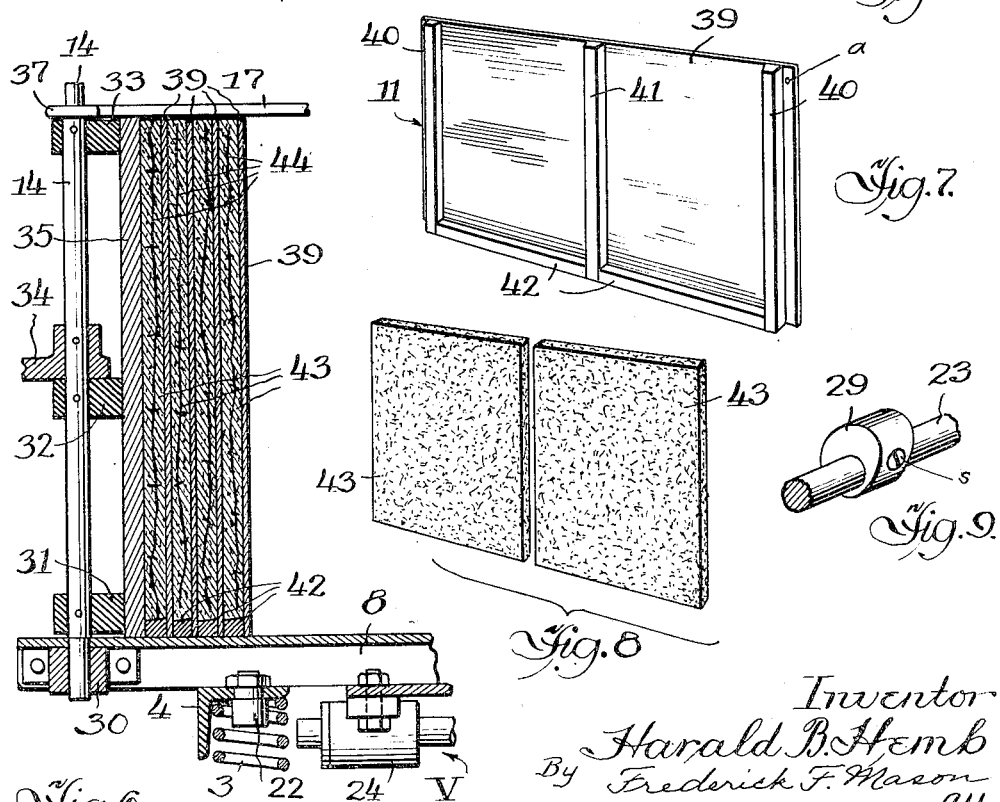
Inventor
Harald B. Hemb
By Frederick F. Mason
Atty.

Patented Mar. 13, 1951

2,545,029

UNITED STATES PATENT OFFICE 2,545,029

VIBRATING APPARATUS FOR MOLDING CONCRETE SLABS

Harald B. Hemb, Glencoe, Ill., assignor to Concrete Products, Inc., Skokie, Ill., a corporation of Illinois Application April 16, 1949, Serial No. 87,916

5 Claims. (Cl. 25—42)

This invention relates to precast concrete slab vibrating apparatus, in which a plurality of open top molds are placed on edge, clamped together with the back of one mold closing the front of an adjacent mold, and the mold-carrying-part of the equipment rapidly vibrated while the concrete mix is being poured into the mold spaces from the open top edges thereof.

As is known, precast concrete slabs are thin compared with their width and length. To manufacture them while the molds are lying flat in horizontal position is extremely slow and occupies very considerable space, as in that event only one thickness of slab can be made at a time. In addition to being slow, such procedure is tedious and the finished slabs do not have the desired uniformity.

In the present invention these disadvantages are overcome and the slabs are cast on edge with a considerable number of open face molds arranged with the back of one closing the face of the next adjacent one throughout the length of the apparatus, and each mold having an open edge at the top of the assembly, whereby the concrete mix may be quickly and easily dumped in over the top edges of the assembled molds which are vibrated while being filled. This saves considerable time and space and produces a much more uniform and attractive product having greater strength and economy.

Among the objects of my invention are: to provide a novel and improved precast concrete slab vibrating apparatus; to provide equipment of the type referred to in which a large number of the slabs are cast on edge and vibrated while being made; to provide novel means for assembling and clamping a considerable number of molds on edge with the back face of one mold closing the open front face of the next adjacent mold, with one edge of each mold being open at the top; to provide novel means for mounting and vibrating such an assembly of molds; to provide an improved arrangement of clamping and vibrating means; to provide an improved construction and arrangement of molds for precast concrete slabs; and such further objects, advantages and capabilities, inherently possessed by my invention, as will later more fully appear.

My invention further resides in the combination, construction and arrangement of parts illustrated in the accompanying drawings, and while I have shown therein a preferred embodiment I wish it understood that the same is susceptible of modification and change without departing from the spirit of the invention.

In the drawings:

Fig. 5 is a top plan view.

Fig. 6 is a vertical zig-zag section on the line 6—6 of Fig. 5.

Fig. 7 is a perspective view looking toward the open front of one of the molds removed from the apparatus.

Fig. 8 is a perspective view of two of the slabs that have been molded in and removed from the mold of Fig. 7 after hardening.

Fig. 9 is an angular view of one of the eccentric vibrator elements and a portion of the shaft on which it is mounted.

Figure 1:
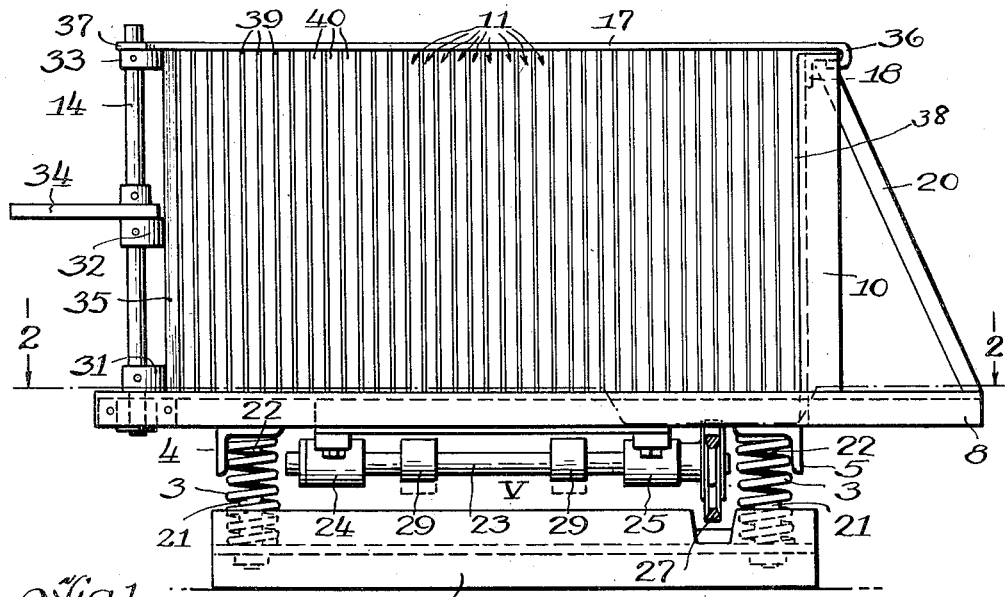
Fig. 1 is a side elevation of an apparatus embodying my invention, but omitting the vibrating motor and showing the driving belt in section.

In the form shown in the drawings, for illustrative purposes only, the apparatus of the present invention comprises generally a pair of laterally spaced apart supporting base members 1 and 2, four sturdy coil springs 3, one adjacent each of the four corners of the apparatus, a pair of laterally extending cross bars 4 and 5 each mounted adjacent its ends upon two of said coil springs, three laterally spaced apart mold-supporting beams 6, 7 and 8 mounted upon said cross bars and fixed thereto to extend therebetween and therebeyond, vertically extending upright members 9 and 10 one at each of the rear corners of the apparatus, a plurality of thin molds 11 resting edgewise on the supporting beams 6, 7 and 8, a plurality of vertically extending clamping shafts 12, 13 and 14 rotatably mounted on supporting beams 6, 7 and 8, a plurality of tension rods, cables or the like 15, 16 and 17 for carrying the clamping reaction between the upper ends of clamping shafts 12, 13 and 14 and the cross bar 18 fixed to the upper ends of upright members 9 and 10, and vibrating mechanism V mounted upon and underneath the middle mold-supporting beam 7 and operated by a suitable motor 19.

Figure 2:
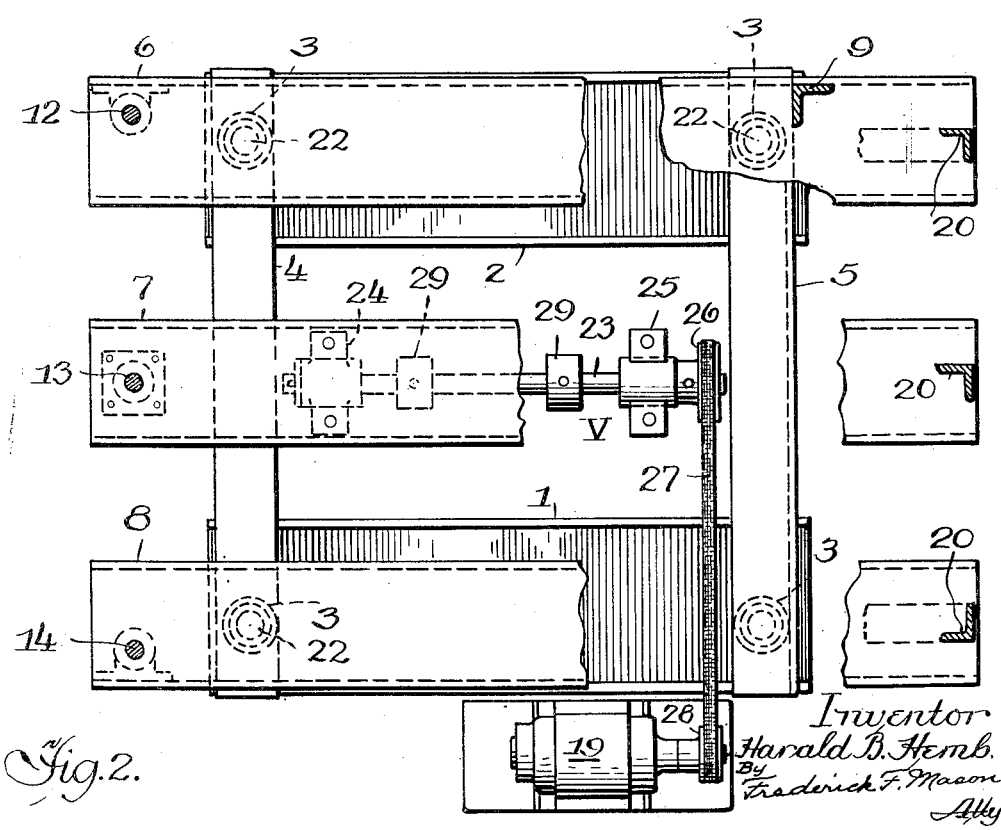
Fig. 2 is a partially broken away horizontal zig-zag section on the line 2—2 of Fig. 1.
Figure 4:
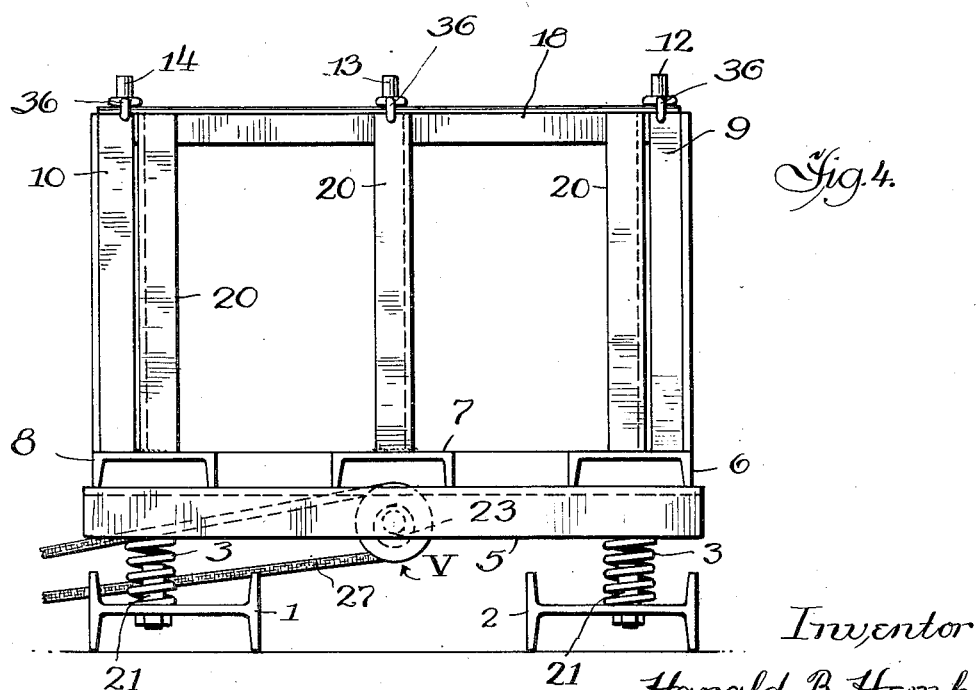
Fig. 4 is a rear elevation, showing a portion of the driving belt but omitting the vibrating motor.

While, for illustrative purposes, I have shown the supporting base members 1 and 2 as being in the form of I-beams, it is to be understood that they may assume any other form adaptable to the purposes intended. The same is also true of the cross bars 4 and 5 which have been shown as angle bars, the mold-supporting beams 6, 7 and 8 which are shown as channel beams, the angle bar uprights 9 and 10, and various of the other parts. For added strength stiffening braces 20, three being shown in Figs. 2, 4 and 5, are fixed to the top cross bar 18 and extend at an angle rearwardly and downwardly to the respective rear ends of the mold-supporting beams 6, 7 and 8, preferably in the form of angle bars welded or otherwise fixed at their ends to the said parts to which they are attached.

Figure 3:
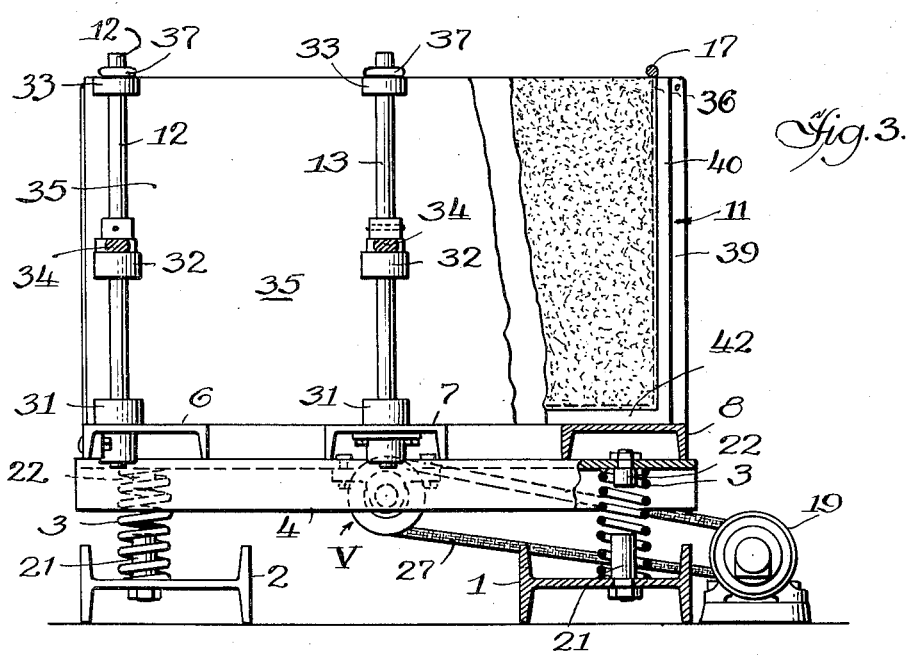
Fig. 3 is a partial front elevation, and partial vertical section on the line 3—3 of Fig. 5, but showing the vibrating motor and belt.

As seen in Fig. 3, each of the base members 1 and 2, at the respective locations of the coil springs 3, has fixed thereto upstanding pins 21 over which these springs are positioned for locating purposes, and each of the cross bars 4 and 5, at the respective locations of these coil springs, has fixed thereto downwardly extending pins 22 extending into the central openings of said springs. This maintains the springs in position and at the same time permits movement of the mold-supporting portions of the apparatus in all directions during operation of the vibrating mechanism. The vibrating mechanism comprises a shaft 23 journalled in bearings 24 and 25 fixed in any suitable manner to the lower portion of the supporting beam 7. Fixed to one end of shaft 23 is a grooved pulley 26 rotated by a belt 27 passing over pulley 28 driven by motor 19. Fixed at longitudinally spaced locations on shaft 23 are two (or any other desired number) eccentric weights or vibrators 29 which are formed with sufficient weight and eccentricity with relation to shaft 23 to give substantial vibration in all directions to the mold-supporting parts of the apparatus, and the molds, when shaft 23 is rotated at a sufficiently high speed. Set screws s enable adjustment of these weights.

As seen in Fig. 6, each of the clamping shafts 12—14 is rotatably mounted at its lower end in a bearing 30 fixed to the under portion of the respective one of said mold-supporting beams 6, 7 and 8. Fixed at spaced intervals along the length of each of shafts 12—14 are cams 31, 32 and 33, which when these shafts are rotated will either loosen or tighten the clamping pressure on the molds, depending on the direction of rotation. Such rotation may be effected by handles 34, one on each shaft, to be swung in a tightening or loosening direction as desired by the operator. This clamping pressure is transmitted by cams 31—33 to the end plate 35, formed preferably of metal, and thence to the molds.

In order to transmit the clamping force uniformly to the plurality of molds, without distortion of parts, or displacement of the upper ends of shafts 12—14, the tension rods or cables 15—17 are each formed at its rear end with a hook 36 to be hooked over the rearwardly extending top flange of the cross bar 18 (see Fig. 1), and at its front end with an eyelet or ring 37 having an opening large enough to be readily slipped over, and removed from the top end of its respective shaft 12—14. This firmly locks the molds in place when the cams 31—33 are turned into clamping position as shown in Figs. 5 and 6.

A rear metal back plate 38 is welded to the upright angle bars 9 and 10 to extend laterally therebetween and from top to bottom thereof, and against which the adjacent face of a mold may rest, as shown in Fig. 1. Or this plate may be of thicker wood or metal as shown at 38' (Fig. 5), either rigidly fixed to the uprights 9 and 10, or not as desired.

One form of mold is shown in Fig. 7, which consists of a metal back plate 39 to which are fixed in the desired locations end strips or ribs 40, an intermediate strip or rib 41, and side strips 42, these strips being of the same thickness as that of the slab to be molded, and their inner edges may be bevelled or not as desired. This enables the forming of two slabs at one time in each mold. As noted in Fig. 7, no strip is attached to the back plate at the top, thus leaving an opening at the top through which the concrete mix may be filled into the mold. As will be understood the strips 40—42 may be attached to the back plate in any desired pattern to enable the making of slabs of different shapes and sizes and number as desired. These strips, if desired, may be bevelled to give draft to the molds to more easily remove the slabs from the molds after they are set and hardened, a pair of these slabs removed from the mold of Fig. 7 being shown at 43 of Fig. 8. One or more holes a may be formed in the upper edge of each end of the back plate 39 for lifting by a hoist or the like.

The cavities in each mold have placed therein before the concrete mix is filled therein, a reinforcing sheet of open mesh wire fabric to serve as reinforcement for the slabs after the concrete has set. These sheets of metal reinforcing fabric are shown at 44 in Fig. 6, and are preferably bent at intervals in opposite directions to provide projections that will touch the inner surface of the back plate 39 at spaced intervals and likewise the outer surface of the back plate of the next forward mold when they are in position in the apparatus. This positions the reinforcing sheet midway of the mold cavity in a plane parallel with the back plate and the open nature of the reinforcement permits the concrete mix to entirely surround the wires thereof and reinforce the slab when the concrete has set.

In operation the molds are placed in the apparatus with their bottom closed edges resting on the supporting beams 6, 7 and 8, and the open edge at the top, with the side edges of the mold in registry from front to back. Each of the molds are positioned with its back plate 39 to the rear and the tapered strips 40—42 extending forwardly. This means that the rear surface of each back plate 39 will serve as the front closed surface of the next mold to the rear. Thus when a considerable number of these molds are placed in vertical edgewise position one in front of the other so as to fill the space provided in the apparatus, and the reinforcing sheets inserted in the mold cavities, the eyelets 37 of the tension rods or cables 15—17 may be slipped over the upper ends of the clamping shafts 12—14 and the handles 34 turned to rotate the cams 31—32 and clamp the molds firmly in position.

The motor 19 will then be started and all that part of the apparatus above and including the supporting beams 6—8 and the molds will be vigorously agitated. The concrete mix will then be poured into the open top edges of the molds while the vibrating motion continues. When the mold cavities have been filled and the vibrating action continued for a desired length of time, the motor will be stopped and the concrete slabs thus formed in the molds allowed to set and harden. After the concrete of the slabs has hardened, the cams will be turned to loosened position and the eyelets 37 removed from shafts 12—14. The filled molds with the hardened slabs will then be lifted out of the apparatus in ones, twos or more as desired, by a hoist, and moved to any desired location for removal of the slabs from the molds. This removal is rendered easy because of the taper or draft formed in the mold strips 40—42. As soon as the molds are cleaned by wiping, or otherwise as desired, and all of the slabs removed from the molds, the operation may be repeated for another cycle.

It is thus seen that, by the present invention, a large number of precast concrete slabs may be easily and quickly made, and removed as soon as the concrete has set. These slabs have many uses, such as walk slabs to replace flag stones for out of doors service, roof, floor and wall slabs, and various other uses to which they are adapted. The vibrating of the apparatus and molds during the filling of the concrete mix therein, and if desired during any extension of time thereafter, causes the concrete mix to settle and positively fill all spaces and crevices in the mold and around the reinforcing sheet, and compact the concrete mix. This prevents the formation of any cavities in the slab and insures the formation of solid slabs throughout their entire mass, in spite of the fact that the slabs are sometimes of considerable thinness.

Having described my invention, I claim:

1. Apparatus for forming precast slabs, comprising, a stationary base structure, spring means mounted on said base structure for vertical and horizontal movement in all directions, a framework mounted on said spring means and having a rigid upstanding mold-support at one end and an upstanding mold-support at the other end and movable with relation to the framework, a plurality of thin, open-top molds adapted to be supported edgewise on the bottom portion of the frame-work, a cross-bar extending laterally across the frame-work and fixed to the upper end of said rigid mold-support, a shaft mounted in the bottom portion of the frame-work outside of the movable mold-support and extending upright above the level of the top edges of the molds in the frame, a pair of cams on said shaft one mounted adjacent the bottom edge of the movable mold-support and the other mounted adjacent the upper edge thereof, an elongated tension member extending along the top edges of the molds and being removably secured at one end to said cross-bar and having an eyelet at its other end to be removably slipped over the upper end of said shaft, means for rotating said cams to clamp the molds between the mold-supports with tension in the tension member, and means for vibrating said frame-work and molds.

2. Apparatus as claimed in claim 1, including three upright shafts each of which carries three cams the third of which cams on each shaft is positioned approximately midway of the height of the movable mold-support, said three shafts being disributed along the outer face of the movable mold-support, there being also provided a similar elongated tension member for each of said other shafts similarly connected thereto and to said cross-bar, whereby when said cams are rotated to tightening position the molds will be clamped with a substantially uniform pressure over their facial areas with all of said tension members being above the open top edges of the molds.

3. Apparatus for forming precast slabs, comprising, a stationary base having four corners, a sturdy coil spring mounted upright in each of said corners, a frame structure mounted on said springs, an upstanding mold-support rigidly fixed to said frame structure adjacent one end thereof and having a cross-bar adjacent its upper end, an upstanding mold-support adjacent the other end of the frame structure and movable longitudinally with relation thereto, a plurality of thin, open-top molds supported edgewise on the bottom portion of the frame structure, a plurality of laterally spaced shafts rotatably mounted on said bottom portion of the frame structure, a plurality of cams fixed to each of said shafts so as to provide a plurality of cams adjacent the top of the movable mold-support and a plurality of cams adjacent the bottom thereof, a handle fixed to each of said shafts to rotate the shaft and cams upon movement of the handle, a plurality of elongated tension members extending longitudinally of the frame structure across the tops of said molds, each of said tension members at one end being detachably secured to said cross-bar and at its other end having a vertical opening of a size to be slipped over the top of a shaft, whereby movement of said handles and cams will clamp the molds between said mold-supports, and means for vibrating said frame structure and molds while the molds are being filled.

4. Apparatus for forming precast slabs, comprising, a stationary base, a movable frame structure on said base, a pair of upstanding mold-supports one fixed to the frame structure adjacent one end thereof and the other movably mounted edgewise on the frame structure adjacent the other end thereof, a plurality of upstanding shafts on the frame structure outside of the movable mold-support, a plurality of cams on each of said shafts, means for rotating said cams, each of said shafts extending upwardly beyond the top edge of said movable mold-support, a plurality of thin open-top molds supported edgewise on said frame structure, and a plurality of tension members extending along the top edge of the molds, each of said tension members at one end being detachably secured to the fixed mold support and at the other end being detachably fixed to a shaft for clamping the molds between the two mold-supports upon rotation of said cams.

5. Apparatus as claimed in claim 4, in which the movable mold-support end of each of the tension members is in the form of an eyelet selectively movable onto and off of the top end of its respective shaft and its other end is in the form of a hook to be hooked onto the fixed mold-support.

HARALD B. HEMB.

REFERENCES CITED

The following references are of record in the file of this patent:

UNITED STATES PATENTS

| Number | Name | Date |
|---|---|---|
| 1,000,089 | Haas | Aug. 8, 1911 |
| 1,184,117 | Morley et al. | May 23, 1916 |
| 1,760,282 | Pedersen | May 27, 1930 |
| 1,810,777 | McKee | June 16, 1931 |
| 1,846,290 | Walter | Feb. 23, 1932 |
| 1,908,104 | Bell | May 9, 1933 |
| 2,186,097 | Burns | Jan. 9, 1940 |